US009706518B2

(12) United States Patent
Ball et al.

(10) Patent No.: US 9,706,518 B2
(45) Date of Patent: Jul. 11, 2017

(54) LOCATION BASED APPLICATION FEATURE NOTIFICATION

(71) Applicant: Apple Inc., Cupertino, CA (US)

(72) Inventors: Matthew B. Ball, South San Francisco, CA (US); Christopher Blumenberg, San Francisco, CA (US); Seejo K. Pylappan, Cupertino, CA (US); Nils Stefan Daniel Bengtsson, Cupertino, CA (US); Per Fahlberg, Sunnyvale, CA (US); Megan M. Frost, San Francisco, CA (US); Marcel van Os, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/292,930

(22) Filed: Jun. 1, 2014

(65) Prior Publication Data
US 2015/0351073 A1 Dec. 3, 2015

Related U.S. Application Data

(60) Provisional application No. 61/962,323, filed on May 30, 2014.

(51) Int. Cl.
*H04W 68/00* (2009.01)
*H04W 68/10* (2009.01)
(Continued)

(52) U.S. Cl.
CPC ............ *H04W 68/00* (2013.01); *H04L 67/18* (2013.01); *H04W 4/001* (2013.01); *H04W 4/021* (2013.01); *H04W 4/025* (2013.01); *H04W 64/00* (2013.01)

(58) Field of Classification Search
CPC ......... H04M 1/72566; H04M 1/72572; H04M 2250/64; H04M 2215/815;
(Continued)

(56) References Cited

U.S. PATENT DOCUMENTS 8,015,167 B1 * 9/2011 Riggs ............... G06F 17/30902
707/705
8,739,249 B1 * 5/2014 Kay ..................... G06F 21/00
726/3

(Continued)

FOREIGN PATENT DOCUMENTS

EP       2631889       8/2013
WO   WO 2010/040405    4/2010

OTHER PUBLICATIONS

PCT/US2015027654, Apr. 24, 2015, Apple Inc.
(Continued)

*Primary Examiner* — Meless Zewdu
(74) *Attorney, Agent, or Firm* — Gianni Minutoli; Page Ponsford; DLA Piper LLP US

(57) ABSTRACT

Some embodiments provide location-based, application-feature notifications for a multi-feature application that executes on a device. For instance, when a feature (e.g., a functionality, or service) of an application becomes available in a particular region, some embodiments provide a notification of the availability of the new feature in the particular region. In some embodiments, the notification is a location-based notification that is provided to only devices that execute in or near the particular region in which the location-based feature has recently become available. In other embodiments, the notification is also provided to devices that are not near the particular region (e.g., are provided to all devices in the United States, when the feature becomes available in California).

22 Claims, 9 Drawing Sheets

(51) Int. Cl.
*H04W 4/02* (2009.01)
*H04W 64/00* (2009.01)
*H04W 4/00* (2009.01)
*H04L 29/08* (2006.01)

(58) Field of Classification Search
CPC ... H04M 1/72597; H04M 19/04; H04W 4/02; H04W 80/00; H04W 4/021; H04W 4/023; H04W 68/00; H04W 68/005; H04W 4/001; H04W 64/00; H04W 4/025; H04W 68/10; H04W 8/02; H04W 8/04; H04W 8/06; H04W 60/00; H04W 4/06; H04W 68/02; H04W 4/185; H04L 41/5012; H04L 29/08657; H04L 29/08684; H04L 67/18; H04L 67/00; G06F 3/048
See application file for complete search history.

(56) References Cited

U.S. PATENT DOCUMENTS

| | | | | |
|---|---|---|---|---|
| 8,849,253 | B2* | 9/2014 | Nasir | H04W 4/001 455/412.2 |
| 9,032,387 | B1* | 5/2015 | Hill | G06F 8/61 717/173 |
| 2004/0193678 | A1* | 9/2004 | Trufinescu | G06F 3/1207 709/203 |
| 2004/0203863 | A1* | 10/2004 | Huomo | H04W 4/02 455/456.1 |
| 2005/0038876 | A1* | 2/2005 | Chaudhuri | G06F 17/3087 709/219 |
| 2006/0138224 | A1* | 6/2006 | Azami | G06Q 20/346 235/385 |
| 2007/0161382 | A1* | 7/2007 | Melinger | H04L 67/18 455/456.1 |
| 2008/0020737 | A1* | 1/2008 | Neil | G06F 9/44505 455/414.1 |
| 2009/0094378 | A1* | 4/2009 | Reus | G06F 15/16 709/235 |
| 2011/0092185 | A1* | 4/2011 | Garskof | G06F 21/35 455/411 |
| 2011/0113423 | A1* | 5/2011 | Yamamoto | G06F 8/60 717/178 |
| 2011/0250875 | A1* | 10/2011 | Huang | H04W 4/02 455/418 |
| 2011/0313874 | A1* | 12/2011 | Hardie | H04W 4/02 705/26.1 |
| 2012/0042036 | A1* | 2/2012 | Lau | G06F 8/61 709/217 |
| 2013/0035116 | A1 | 2/2013 | Hymel et al. | |
| 2013/0115972 | A1 | 5/2013 | Ziskind et al. | |
| 2013/0151506 | A1* | 6/2013 | Dessouky | H04M 3/42348 707/719 |
| 2013/0166200 | A1 | 6/2013 | Dhanami et al. | |
| 2013/0172013 | A1* | 7/2013 | Dessouky | H04W 64/00 455/456.3 |
| 2013/0244685 | A1* | 9/2013 | Dempski | H04L 67/306 455/456.1 |
| 2013/0311539 | A1* | 11/2013 | Ngai | G06F 9/5072 709/201 |
| 2014/0032707 | A1* | 1/2014 | Doshi | G06F 9/542 709/217 |
| 2014/0129951 | A1* | 5/2014 | Amin | G06Q 50/30 715/738 |
| 2014/0132400 | A1 | 5/2014 | Heaven et al. | |
| 2014/0171116 | A1 | 6/2014 | LaMarca et al. | |
| 2014/0213233 | A1* | 7/2014 | Parry | H04W 8/245 455/418 |
| 2014/0256357 | A1* | 9/2014 | Wang | H04W 4/02 455/456.3 |
| 2014/0274145 | A1* | 9/2014 | Cronin | H04W 4/021 455/456.3 |
| 2014/0278051 | A1 | 9/2014 | McGavran et al. | |
| 2015/0350827 | A1* | 12/2015 | Birch | H04W 8/04 455/456.1 |

OTHER PUBLICATIONS

International Search Report and Written Opinion of PCT/US2015027654, Aug. 20, 2015, Apple Inc.
WO 2015/183445, Dec. 3, 2015, Apple Inc.

* cited by examiner

LOCATION BASED APPLICATION FEATURE NOTIFICATION

CLAIM OF BENEFIT TO PRIOR APPLICATIONS

This application claims the benefit of U.S. Provisional Patent Application 61/962,323, filed May 30, 2014.

BACKGROUND

Today, many applications for mobile devices have multiple features. In many instances, not all the features of a multi-feature application is available in all regions in which the mobile device may operate. At times, this is because of government regulations. At other times, this is because of lack of data for making the feature available in a particular locality. Accordingly, mobile device applications gradually roll out a feature in different regions as the feature becomes available in the regions.

BRIEF SUMMARY

Some embodiments provide location-based, application-feature notifications for a multi-feature application that executes on a device. For instance, when a feature (e.g., a functionality, or service) of an application becomes available in a particular region, some embodiments provide a notification of the availability of the new feature in the particular region. In some embodiments, the notification is a location-based notification that is provided to only devices that execute in or near the particular region in which the location-based feature has recently become available. In other embodiments, the notification is also provided to devices that are not near the particular region (e.g., are provided to all devices in the United States, when the feature becomes available in California).

In some embodiments, the application may be initially deployed on multiple devices in multiple regions, with one of its features (i.e., one of its functionalities) available in certain regions but not in other regions. As the feature becomes available for a new region, some embodiments provide notifications to devices that execute the application in the new region or near the new region. As mentioned above, some embodiments provide such notifications to devices that are not near the new region, but are otherwise somehow associated with the new region (e.g., are within the same state, the same geographic area (e.g., the West Coast), or the same country, etc.)

Some embodiments provide the location-based, feature notification within the application. Alternatively, or conjunctively, some embodiments provide the notification as a system alert that the device provides through one or more of its notification mechanisms (e.g., provides in a notification center, provides in a locked-screen notification display, etc.).

One specific use case example of some embodiments is to provide location-based feature notifications for a map application that executes on a device. For instance, in some embodiments, a map application provides three-dimensional (3D) flyover views of certain localities, where the 3D flyover views are stereoscopic rendered views of the localities based on image data that is captured by vehicles (e.g., planes, helicopters, satellites, etc.) that flyover the localities. Initially, the flyover feature may only be available in a few cities. As the flyover feature becomes available in a new city, some embodiments have the map application, or the device that executes the map application, provide a notification regarding the availability of the flyover feature of the map application for the new city when the device is in the new city or is in a nearby location.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

Figure 1:
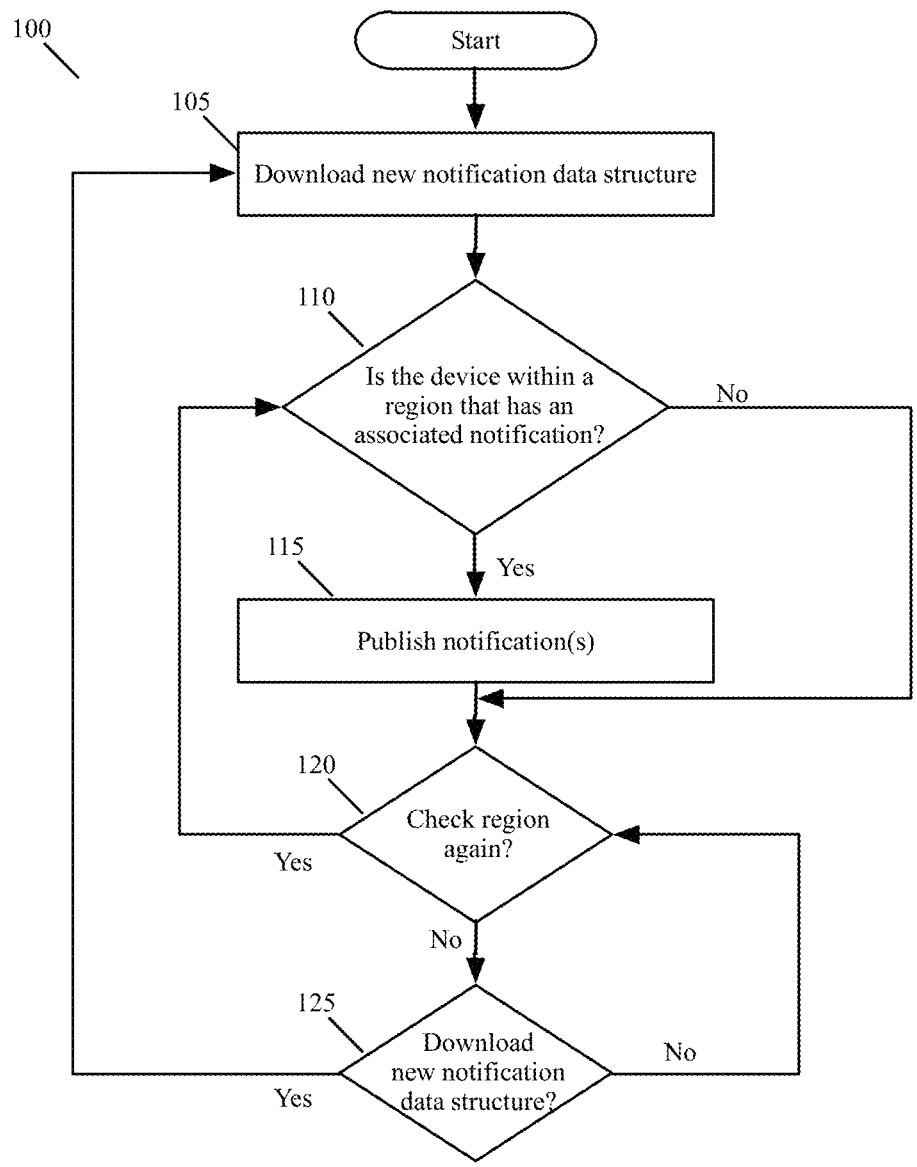
FIG. 1 conceptually illustrates a process that some embodiments perform to provide location-based, application-feature notifications.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide location-based, application-feature notifications for a multi-feature application that executes on a device. In some embodiments, a feature is a functionality or service of an application. In some of these embodiments, the feature becomes available when data needed for the feature becomes available. For instance, when the multi-feature application is a map application, the feature may be a map view, route view, or navigation modality that becomes available in a locality because the map data needed for these views and/or modes becomes available.

When a feature (e.g., a functionality or service) of an application becomes available in a particular region, some embodiments provide a notification of the availability of the new feature in the particular region. In some embodiments, the notification is a location-based notification that is provided to only devices that execute in or near the particular region in which the location-based feature has recently become available. In other embodiments, the notification is also provided to devices that are not near the particular region (e.g., are provided to all devices in the United States, when the feature becomes available in California).

In some embodiments, the application is an operating system of the device, while in other embodiments, the application is an application that executes on top of the device's operating system. In some embodiments, the application may be initially deployed on multiple devices in multiple regions, with one of its features (e.g., one of its functionalities or services) available in certain regions but not in other regions. As the feature becomes available for a new region, some embodiments provide notifications to devices that execute the application in the new region or near the new region. As mentioned above, some embodiments provide such notifications to devices that are not near the new region, but are otherwise somehow associated with the new region (e.g., are within the same state, the same geographic area (e.g., the West Coast), or the same country, etc.).

Some embodiments provide the location-based, feature notification within the application. Alternatively, or conjunctively, some embodiments provide the notification as a system alert that the device provides through one or more of its notification mechanisms (e.g., provides in a notification center, provides in a locked-screen notification display, etc.).

One specific use case example of some embodiments is to provide location-based feature notifications for a map application that executes on a device. For instance, in some embodiments, a map application provides three-dimensional (3D) flyover views of certain localities, where the 3D flyover views are stereoscopic rendered views of the localities based on image data that is captured by vehicles (e.g., planes, helicopters, satellites, etc.) that flyover the localities. Initially, the flyover feature may only be available in a few cities. As the flyover feature becomes available in a new city, some embodiments have the map application, or the device that executes the map application, provide a notification regarding the availability of the flyover feature of the map application for the new city when the device is in the new city or in a nearby location.

FIG. 1 illustrates a process 100 that provides location-based, application-feature notifications for a particular multi-feature application that executes on a device. In some embodiments, this process is performed periodically by the device, while in other embodiments this process 100 is performed periodically by the particular application that executes on the device. As mentioned below, the periodicity of this process is different in different embodiments (e.g., the process is repeated every X hours in some embodiments, while it is repeated every Y hours in other embodiments). The device in some embodiments is any type of electronic device (e.g., a mobile, handheld device (such as a tablet or smartphone), a laptop computer, a desktop computer, etc.).

As shown, the process 100 initially downloads (at 105), from a set of one or more servers, a notification data structure (e.g., a notification file). In some embodiments, the process downloads the notification data structure through a communication network (e.g., the Internet and/or wireless or cellular communication network) that communicatively connects the device with the set of servers. The set of servers includes different types of servers in different embodiments of the invention. Examples of such servers include (1) servers that distribute applications to devices, (2) servers that distribute data regarding the particular application to the devices, (3) servers that distribute updates or feature notifications to the devices, etc.

The downloaded notification data structure in some embodiments may include (1) no new notifications, (2) one or more notifications regarding the availability of one or more features of the particular application, and/or (3) such notifications that the server set previously provided in one or more earlier notification files. In other embodiments, the downloaded notification structure may include notifications regarding the availability of two or more features of two or more applications that execute on the device. In other words, the downloaded notification structure in some embodiments may provide feature notifications for applications other than the particular application. In some embodiments, the process 100 leaves the processing of feature notifications regarding other applications to other processes, while in other embodiments, the process 100 also processes these feature notifications.

In some embodiments, the notification data structure is a notification file that contains (1) a list of geographic regions and (2) notification data for each geographic region on the list. Each geographic region in some embodiments is defined in terms of a latitude and longitude pair, and data (e.g., a radius) for defining a shape (e.g., a circle or polygon) about the latitude and longitude pair. In some embodiments, the notification data for a geographic region includes a string for display and a list of notification destinations for displaying the supplied string.

The notification data in some embodiments also includes (1) one or more titles for one or more user interface (UI) affordances (e.g., buttons) that are to be part of the displayed notification, and (2) one or more uniform resource locators (URLs) that define one or more functions to perform when the UI affordances are selected. For instance, as mentioned below, one notification destination might be a notification banner on a home page of the device. This banner has an associated URL in some embodiments, which causes the device to call a function to show a locality in the map when the banner is selected. In some embodiments, the notification file includes (1) notifications for different features, and (2) different URLs for different functions to perform when the different notifications are selected.

After downloading (at 105) the notification data structure, the process determines (at 110) whether the downloaded data structure includes any new notifications for one or more application features for the region in which the device currently operates. In some embodiments, the region is where a feature has recently become available. In other embodiments, the region can also be near the region in which the feature has recently become available, or a region that is somehow associated with the region in which the feature has been recently made available (e.g., is within the same city, state, country, etc. as the region with the new feature).

In determining whether the data structure downloaded at 105 contains any new notifications for one or more application features, the process 100 examines a cache of previous notifications it processed in some embodiments. This is because in these embodiments the downloaded notification data structure may contain feature notifications for a sufficiently long duration of time during which the process 100 may download multiple notification data structures at multiple different instances of time. In other embodiments, the process does not need to maintain or examine a cache of previous notifications that it has processed because the server set that distributes the notification structure distributes a new application feature notification only once to each device. For instance, from a new feature notification list for a particular device, the server set in some embodiments removes a notification feature announcement for the particular device after the process 100 downloads the notification structure for the particular device.

To determine (at 110) whether the downloaded data structure includes any new notifications for one or more application features for the region in which the device currently operates, the process 100 uses one or more location services (e.g., Global Positioning System (GPS) services, WiFi service, triangulating cellular location services, etc.) of the device to identify the location of the device. The process then compares the identified location of the device with each region that has an associated notification in the received notification file, to determine whether the device falls within any region that has a notification in the notification file. As further described below, the process provides a notification about the new feature to the device when the device falls within a region that has a notification, while not providing a notification of the new feature when the device does not fall within the region.

In some embodiments, even if the device does not fall within a region that has a notification, the device might publish on the device a notification for the region if that region is somehow related to the device's region (e.g., is in the same state as the device's region). Accordingly, for these embodiments, the process compares the identified location of the device with each region that has an associated notification in the received notification file, to determine whether the device's region is within or is related to any region that has a notification in the notification file. Alternatively, or conjunctively, the process 100 in some embodiments publishes a notification about a new feature in a region even when the device is not in that region and the device's current region is not associated with the region, so long as the region with the associated notification is somehow otherwise associated with the device itself (e.g., it is a region in which the device was registered or it is a region to which the device often travels).

When the process 100 determines that the downloaded notification data structure does not contain any new notification for one or more application features that are related to the device's region, it transitions to 120, which will be described below. On the other hand, when the process 100 determines that the downloaded notification structure does contain one or more new feature notifications for a region associated with the device, it transitions to 115. As mentioned above, the new feature notifications relate to just the particular application in some embodiments, while they may relate to new features of two or more applications, including the particular application, in other embodiments.

At 115, the process 100 publishes a notification regarding each new application feature that it identified at 110 to one or more notification mechanisms of the particular application and/or of the device on which the application executes. For instance, in some embodiments, the process publishes the location-based, feature notification just within the particular application that has the new feature available. Alternatively, or conjunctively, the process 100 provides the notification as a system alert that the device provides through one or more of its notification mechanisms (e.g., provides in a notification center, provides in a locked-screen notification display, etc.). Examples of such notification publications will be further described below by reference to FIGS. 4-7.

At 115, the process 100 in some embodiments also creates one or more records for one or more published notifications that it provides for one or more new application features. The process creates such records in some embodiments because the server set might include the same notifications regarding the same features in subsequent notification files. Accordingly, in these embodiments, the process (at 115) first checks to its previously created records to determine whether the process has previously provided a notification regarding a feature that the current notification file is announcing for the region of the device. The process then only provides (at 115) a notification regarding a feature that the current notification file is announcing for the region of the device, when it determines (at 115) that it has not previously provided a notification regarding this feature.

From 115, the process transitions to 120. At 120, the process determines whether it should check the previously downloaded notification data structure to determine whether it contains a notification for the current region of the device. The process performs this check because the device may have moved to a new region since the last time the process performed this check, and the notification data structure may have a new feature notification for the device's new region. In other words, for any notification data structure that it downloads (e.g., downloads every N hours, where N is a number such as 6, 8, 12, 24, etc.), the process performs a region check multiple times (e.g., M times during the N hours, where M is a number such as 5, 10, etc.) to determine whether the location of the device has sufficiently changed so that a feature notification that was not previously necessary for announcement has now become necessary for announcement.

When the process determines (at 120) that it should check the downloaded feature notification structure for the current location of the device, it transitions back to 110 to repeat this operation for the current location of the device. Otherwise, the process transitions to 125 to determine whether it should download a new feature notification data structure. As mentioned above, the process downloads from the server set a new feature notification data structure periodically (e.g., every 6 hours, 8 hours, 12 hours, 24 hours, etc.). Whenever it is time for the process to download a new data structure, it transitions from 125 to 105. Otherwise, the process transitions from 125 back to 120 when it determines (at 125) that it does not need to download a new feature notification data structure.

Figure 2:
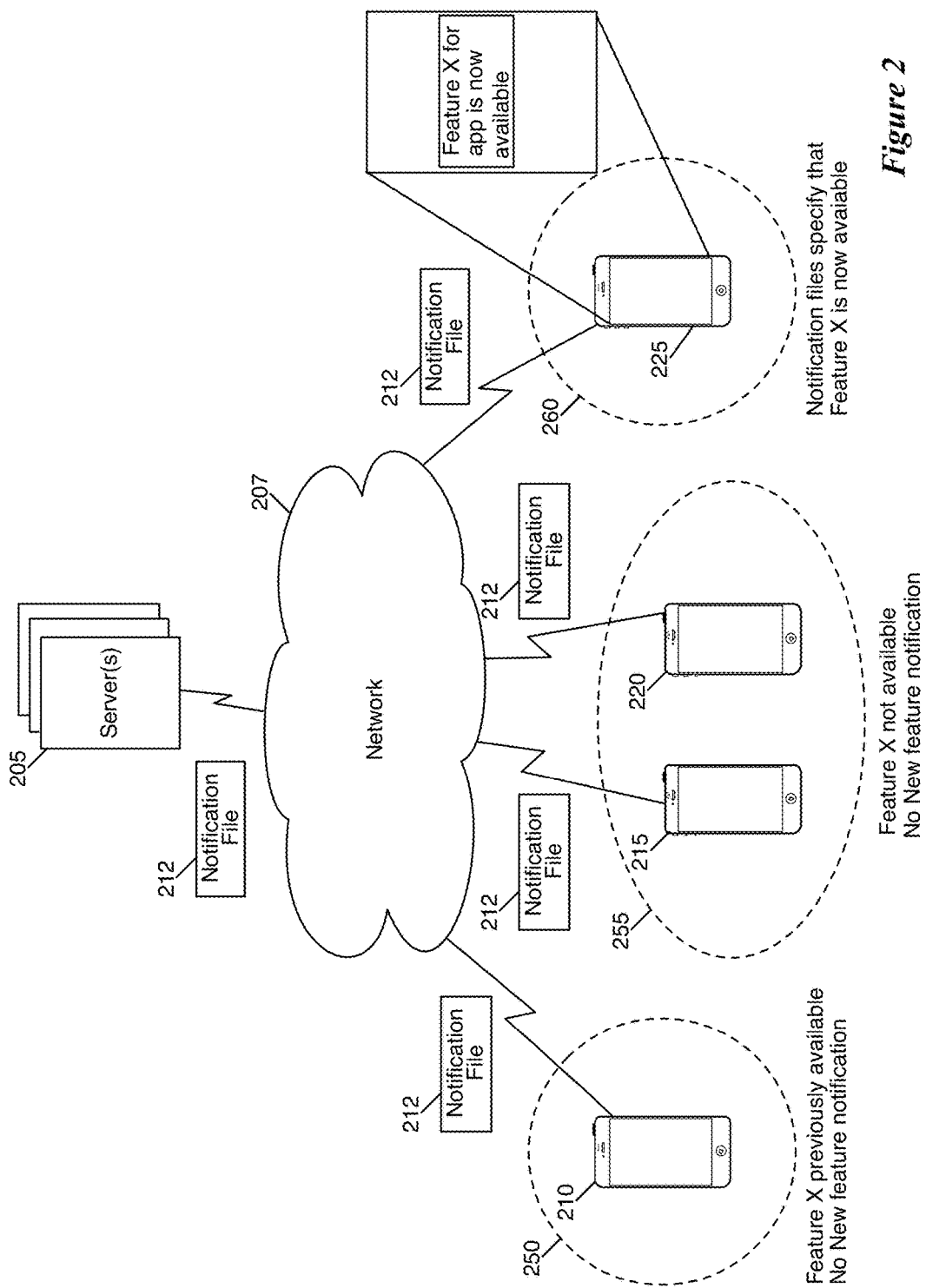
FIG. 2 illustrates an example of multiple devices in multiple regions receiving new feature notification files.
Figure 3:
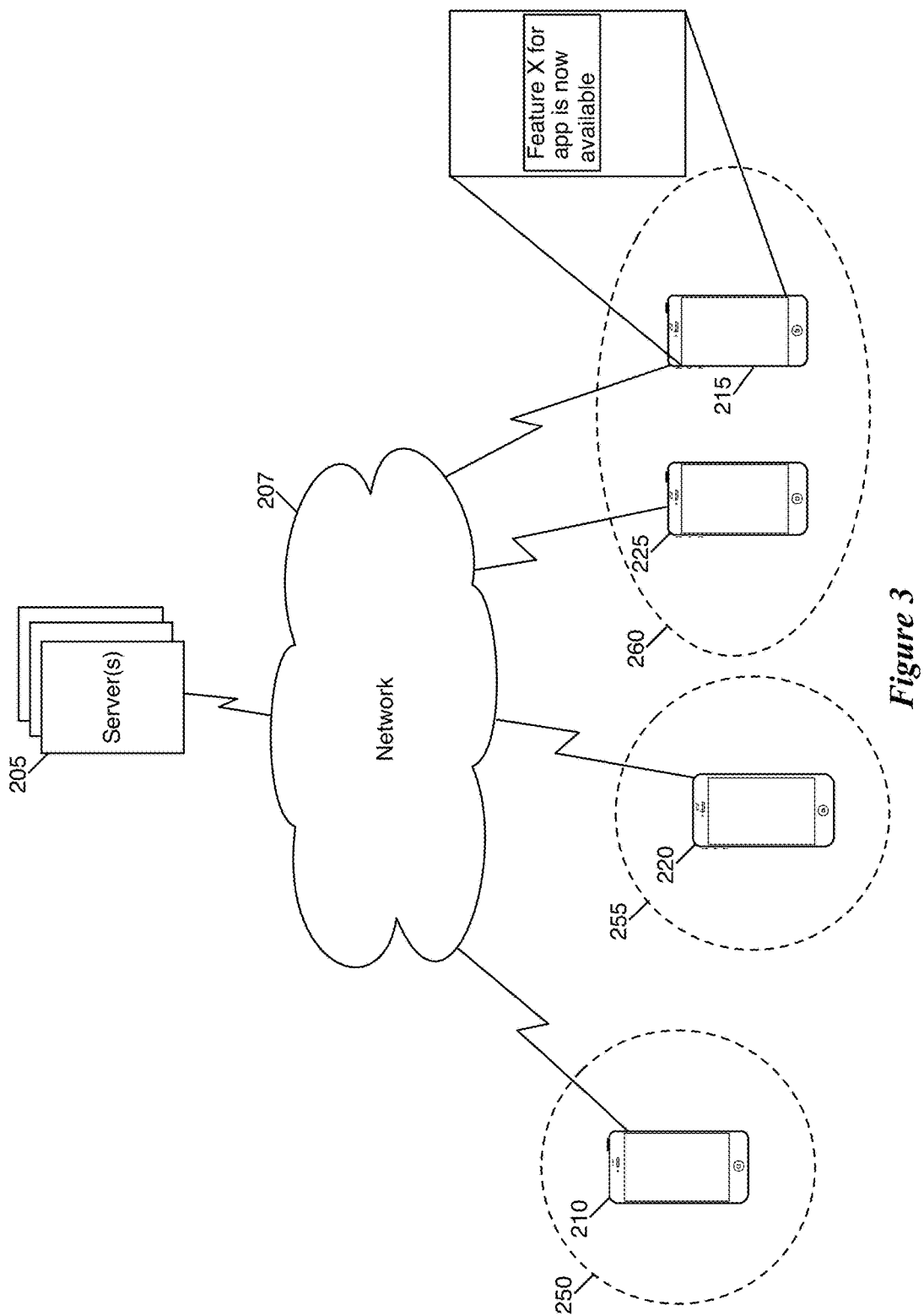
FIG. 3 illustrates an example of multiple devices in multiple regions receiving new feature notification files.

FIGS. 2 and 3 present an example that illustrates the use of the process 100 by multiple devices in multiple regions to receive new feature notification files, and in some cases, to provide new application feature notifications. FIG. 2 illustrates four mobile devices 210, 215, 220, and 225 that communicatively couple to a set of servers 205 through a communication network 207 to receive notification files 212. In some embodiments, the communication network 207 is a wireless communication network that connects to the devices wirelessly and connects to the server set through the Internet.

This figure shows that the device 210 is within a region 250, the devices 215 and 220 are within a region 255, and the device 225 is within a region 260. These four devices 210, 215, 220, and 225 execute one particular application. In some embodiments, all of the notification files 212 that are sent to all of these four devices specify that a particular feature of the particular application has become available in region 260. This particular feature was previously available in region 250, and is not currently available in region 255. Hence, the device 210 does not provide any new notification regarding the particular feature because this feature was previously available in region 250. Similarly, the devices 215 and 220 do not provide any new feature notifications regarding the particular feature as the particular feature is not available in region 255. On the other hand, as shown, the device 225 provides a new feature notification to draw its user's attention towards the recent availability of the particular feature in the region 260.

FIG. 3 illustrates the same example as in FIG. 2, except now the device 215 has moved from the region 255 to the region 260 a short while after the notification file 212 was distributed by the server set 205. As shown, the device 215 provides a new feature notification to draw its user's attention towards the recent availability of the particular feature in the region 260.

One of ordinary skill will realize that the examples illustrated in FIGS. 2 and 3 could be implemented differently in other embodiments. For instance, in some embodiments, the device 210 provides a new feature notification regarding the addition of the particular feature in the region 260, even though the device 210 operates in region 250. This is because the device 210 (or the application that executes on the device 210) detects that the region 260 or the device 210 is somehow associated with the region 250 and this association requires notifications to devices in region 250 when a feature is added to the application in region 260. For example, the device 210 detects that regions 250 and 260 are in the same state, and hence a notification regarding region 260 should be presented to a device in region 250. Alternatively, or conjunctively, the device 210 in some embodiments provides the notification regarding the feature availability in region 260 because even though the device 210 is currently in region 250, this device is often in region 260 and hence should be notified about the availability of new features in region 260.

Also, in the examples illustrated in FIGS. 2 and 3, the server set 205 provides the same notification file 212 to all of the devices in the different localities. This may be the case because, in some embodiments, the server set 205 provides the same notification file at a particular time to all the devices in a large locality, e.g., in a state or country. However, in other embodiments, the server set 205 does not provide the same notification file to different devices in different regions. For instance, in other embodiments, the server set 205 does not provide notification that the particular feature has become available in region 260 to the device 210 in region 250, because this feature was previously available in the region 250. Similarly, in this example, the server set 205 in some embodiments does not provide notification of this feature becoming available in region 260 to devices in region 255 because this feature is not available in this region.

FIGS. 4-7 illustrate several different notification mechanisms that some embodiments use to provide a notification, on a device, of an application feature that recently becomes available in a new locality. In all these examples, the device is a mobile device 400, the application is a map application, the locality is Chicago, and the application features that becomes available in Chicago is the flyover 3D stereoscopic rendered view of Chicago.

Figure 4:
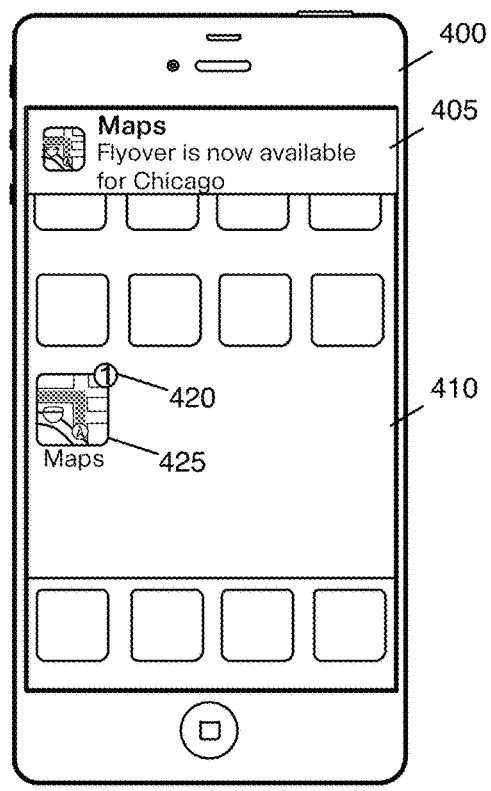
FIG. 4 illustrates an example of displaying a notification banner.

FIG. 4 illustrates a notification banner 405 that is presented on a page 410 that is displayed on a touch-sensitive display screen of the mobile device 400. The page 410 is a page that displays multiple rows of icons, such as application icons. The banner 405 is presented on top of this page, to inform the user of the device that the flyover feature of the map application (called Maps in this example) is now available in Chicago. In some embodiments, this notification remains on the page 410 for a duration of time, after which it automatically disappears. In other embodiments, this notification remains on the page 410 until the user performs an action. Examples of such user actions in some embodiments include selecting the notification banner (e.g., by tapping on a touch-sensitive screen of the device) to see more information regarding this notification, or directing the removal of this banner (e.g., by selecting a button (not shown) in this banner or performing a swipe gesture on the banner).

FIG. 4 also illustrates that some embodiments signify a notification regarding the map application by placing a legend 420 an icon 425 of the map application on page 410. Some embodiments use this legend in conjunction with or instead of the notification banner 405. As with the notification banner 405, some embodiments maintain the legend on the icon 425 for a duration of time, while other embodiments maintain this legend on the icon 425 until the user performs an action with respect to it (e.g., until the user selects the legend to see more information about the notification).

Figure 5:
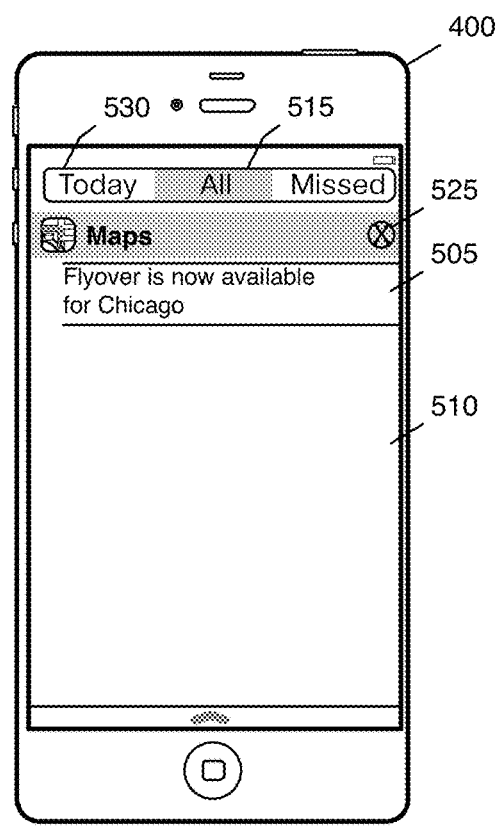
FIG. 5 illustrates an example of displaying a new feature notification within a notification center.

FIG. 5 illustrates a new feature notification 505 that is placed in a notification center 510 of the device 400. In some embodiments, this notification center is analogous to notification centers that are found in many of today's smartphones, such as the notification centers in iPhones® sold by Apple Inc. As shown, the notification 505 appears under the All tab 515 of notification center 510, although in other embodiments it may be placed under other tabs (such as the Today tab 530) of the notification center 510. As in FIG. 4, the notification 505 informs the user of the device that the flyover feature of the map application is now available in Chicago.

In some embodiments, this notification 505 remains in the notification center for a duration of time, after which it automatically disappears. In other embodiments, this notification remains in the notification center until the user performs an action. Examples of such user actions in some embodiments include selecting the notification banner (e.g., by tapping on a touch-sensitive screen of the device) to direct the map application to present a flyover view of Chicago (i.e., of the locality associated with the new feature), or directing the removal of this banner (e.g., by tapping on close control 525).

Figure 6:
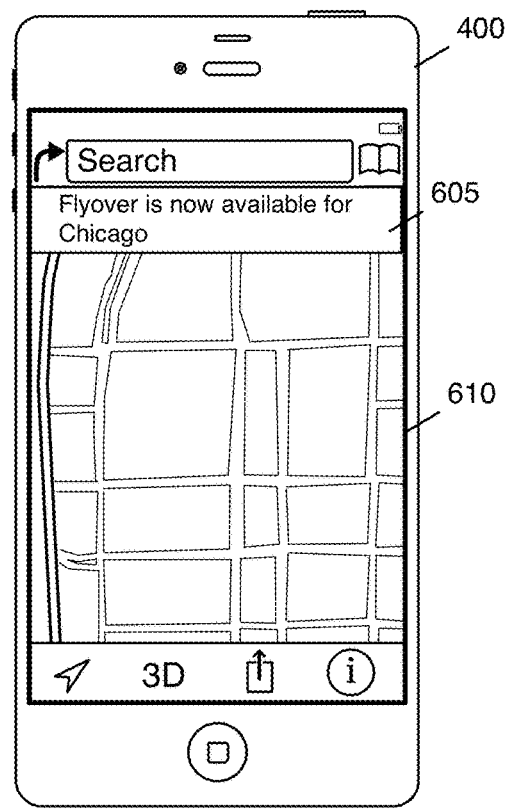
FIG. 6 illustrates an example of displaying a notification banner within a mapping application of some embodiments.

FIG. 6 illustrates an in-application notification banner 605 that is presented on a map 610 that is displayed by the map application. The banner 605 is presented on top of this map, to inform the user of the device that the flyover feature of the map application (called Maps in this example) is now available in Chicago. In some embodiments, this notification remains on the map 610 for a duration of time, after which it automatically disappears. In other embodiments, this notification remains on the map 610 until the user performs an action, e.g., directs the removal of this banner, or selects the notification banner (e.g., by tapping on a touch-sensitive screen of the device) to direct the map application to present a flyover view of Chicago.

Figure 7:
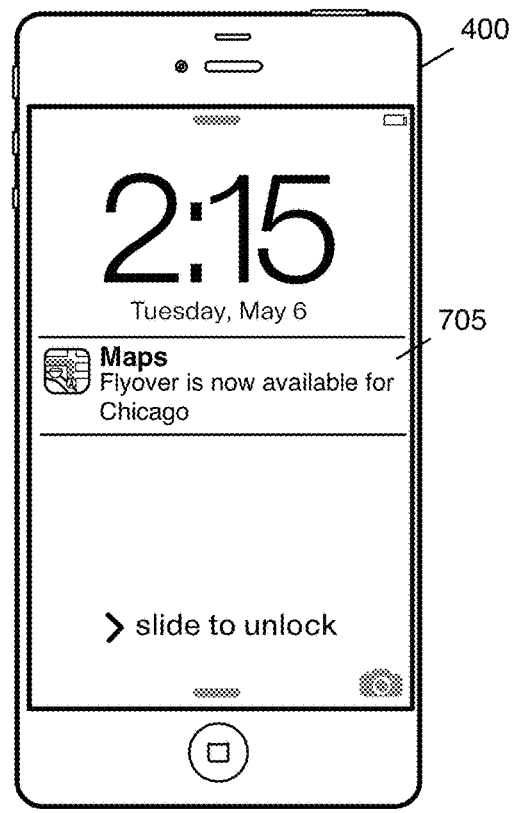
FIG. 7 illustrates an example of displaying a new feature notification, on a device, while in a locked-screen mode.

FIG. 7 illustrates a new feature notification 705 that is provided on a locked-screen display of the device 400. In some embodiments, the device 400 has a touch-sensitive screen that can be placed in a locked-screen mode to reduce the number of touch-interactions that it provides in this mode. The locked-screen mode and the display of notifications during the locked-screen mode are analogous to such modes and such displays that are found in many of today's smartphones, such as the iPhones® sold by Apple Inc. As shown, the notification 705 informs the user of the device that the flyover feature of the map application is now available in Chicago.

Even though several embodiments were described above for providing notification of new flyover views, one of ordinary skill will realize that the location-based feature notification of some embodiments provides notification regarding other features. For instance, the notification process of some embodiments provides notification regarding new transit map data (e.g., for displaying transit routes and schedules) for different localities when such map data becomes available in those localities. Also, the notification process of some embodiments provides notifications regarding non-map application features. For instance, the notification process provides notification of new media content that can be accessed in new localities, or new applications that can be acquired in new localities.

Figure 8:
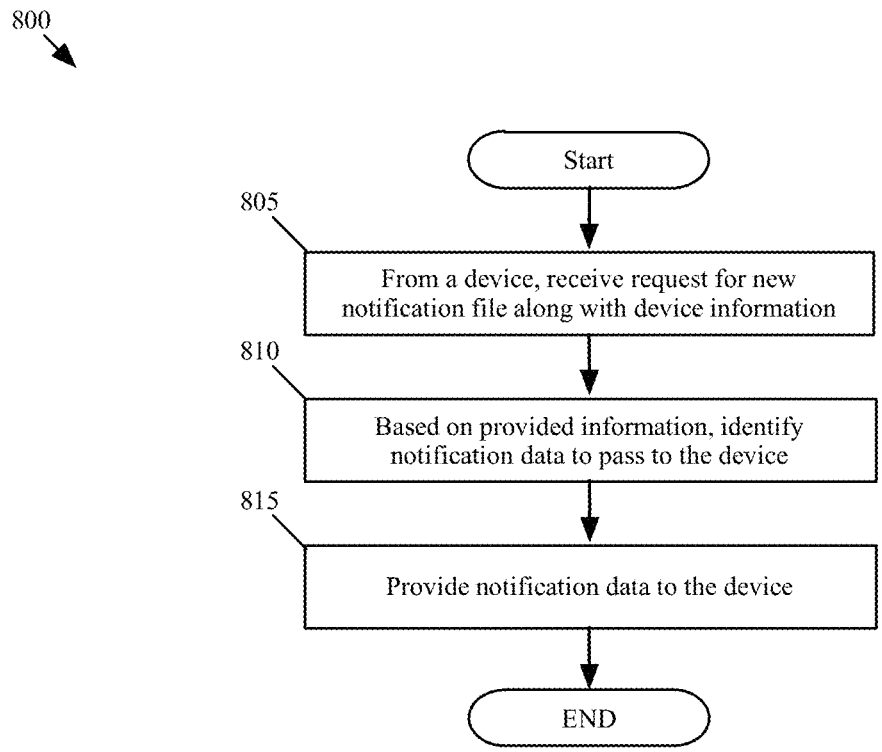
FIG. 8 conceptually illustrates a process that some embodiments perform to provide notification data to devices.

FIG. 8 illustrates a process 800 that a notification server in the server set 205 performs in some embodiments. The notification server performs this process each time a device contacts the server through a network to obtain a new notification file. As mentioned above, the devices contact the server set 205 periodically (e.g., every 6 hours) to download a new notification file.

As shown, the process 800 initially receives (at 805) a request from a device for a new notification file. With this request, the process 800 in some embodiments receives some information about the requesting device. The device provides different information about itself in different embodiments. Examples of information that may be provided by a device in some embodiments includes a unique identification number for the device, account credentials for the user of the device, and/or geographic data regarding the device's current location.

After 805, the process searches (at 810) its data storages (e.g., its databases) to identify any notification that it has to provide the device. In some embodiments, the process provides the same notification data records to each device that contacts the server set during a period in which the notification data has not changed. In other embodiments, the process gathers the notification data based on the current location of the device. For instance, in some embodiments, the process gathers notification data for a country when it determines that the device is within that country. In some embodiments, the process gathers notification data for smaller regions that contains the device. For instance, the process in some embodiments collects, from its data storages, notification data for only the city or state in which the device is currently located.

After gathering (at 810) the notification data for the device, the process packages the gathered data in a notification file and transmits (at 815) this notification file to the device through the network. As mentioned above, the process 800 might provide the same notification for the availability of the same feature in several different notification files that it provides to a device in several of its different iterations. In these embodiments, the device has the task of ensuring that it does not provide the same notification regarding the same feature multiple times. In other embodiments, however, the process 800 maintains records to ensure that it provides a notification regarding a new feature only once to a device. For these embodiments, the process gathers (at 810) the notification data by first collecting the notification data and then eliminating from this collection the notification data that the process previously provided to the device.

After 815, the process 800 ends.

The server set 205 performs the process 800 for each request that it gets from each device. In some embodiments, the process provides the same notification data records to each device that contacts the server set during a period in which the notification data has not changed. In other embodiments, however, the process provides different notification data records to different devices based on the location of the devices. For instance, in some embodiments, the process provides devices in China with different location-based, application-feature notifications than the devices in the U.S.

The process 800 is performed each time a device sends a request to the server set 205. However, instead of waiting for a device to pull the notification data through such a request, the process 800 of other embodiments pushes new notification data records periodically or upon availability to the mobile devices.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
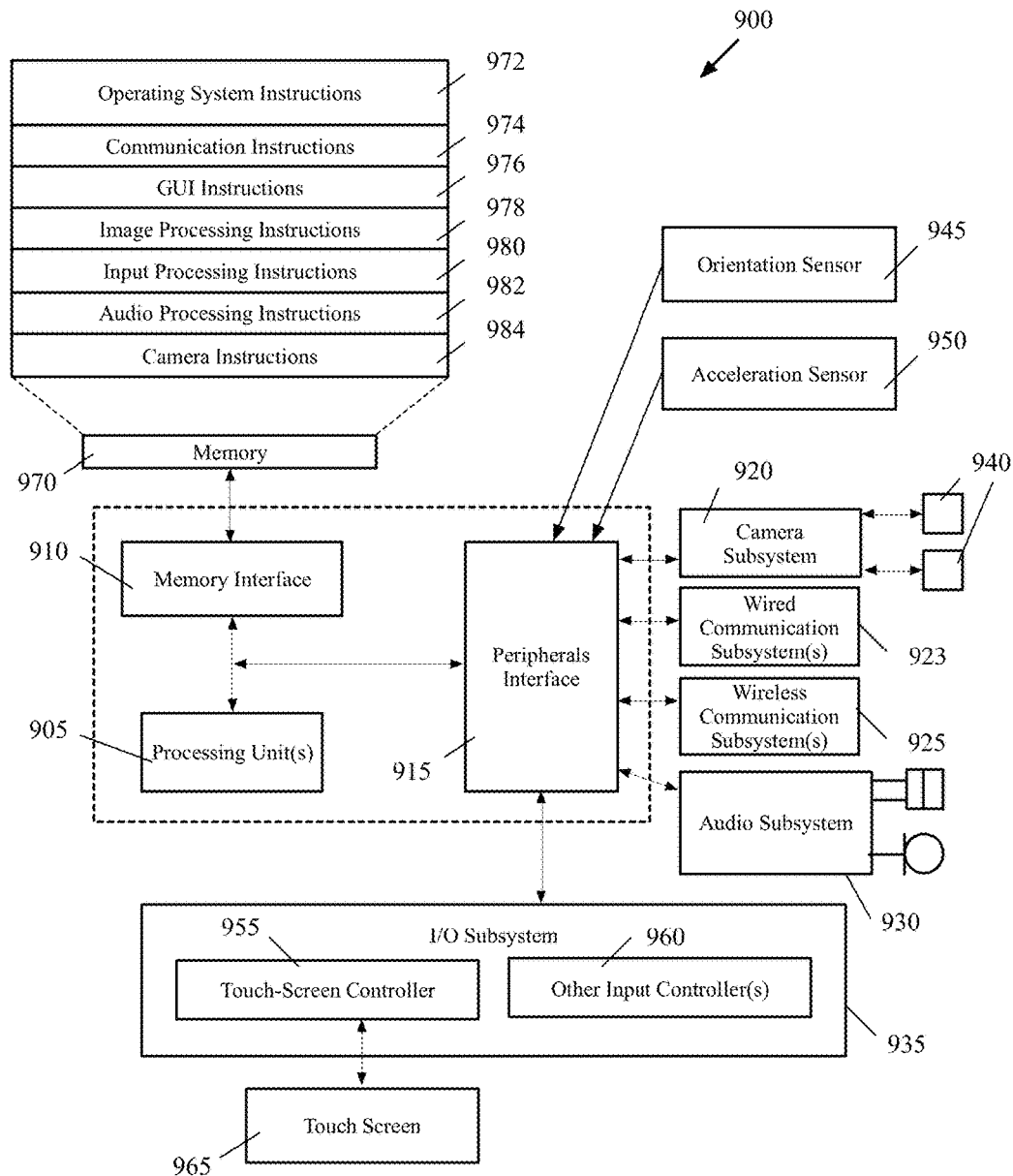
FIG. 9 illustrates an example of an architecture of a mobile computing device.

The applications of some embodiments operate on mobile devices, such as smart phones (e.g., iPhones®) and tablets (e.g., iPads®). FIG. 9 is an example of an architecture 900 of such a mobile computing device. Examples of mobile computing devices include smartphones, tablets, laptops, etc. As shown, the mobile computing device 900 includes one or more processing units 905, a memory interface 910 and a peripherals interface 915.

The peripherals interface 915 is coupled to various sensors and subsystems, including a camera subsystem 920, a wireless communication subsystem(s) 925, an audio subsystem 930, an I/O subsystem 935, etc. The peripherals interface 915 enables communication between the processing units 905 and various peripherals. For example, an orientation sensor 945 (e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wireless communication subsystem 925 serves to facilitate communication functions. In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions, such as voice recognition (e.g., for searching), digital recording, etc.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 972. The OS 972 includes instructions for handling basic system services and for performing hardware dependent tasks.

The memory 970 also includes communication instructions 974 to facilitate communicating with one or more additional devices; graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

Figure 10:
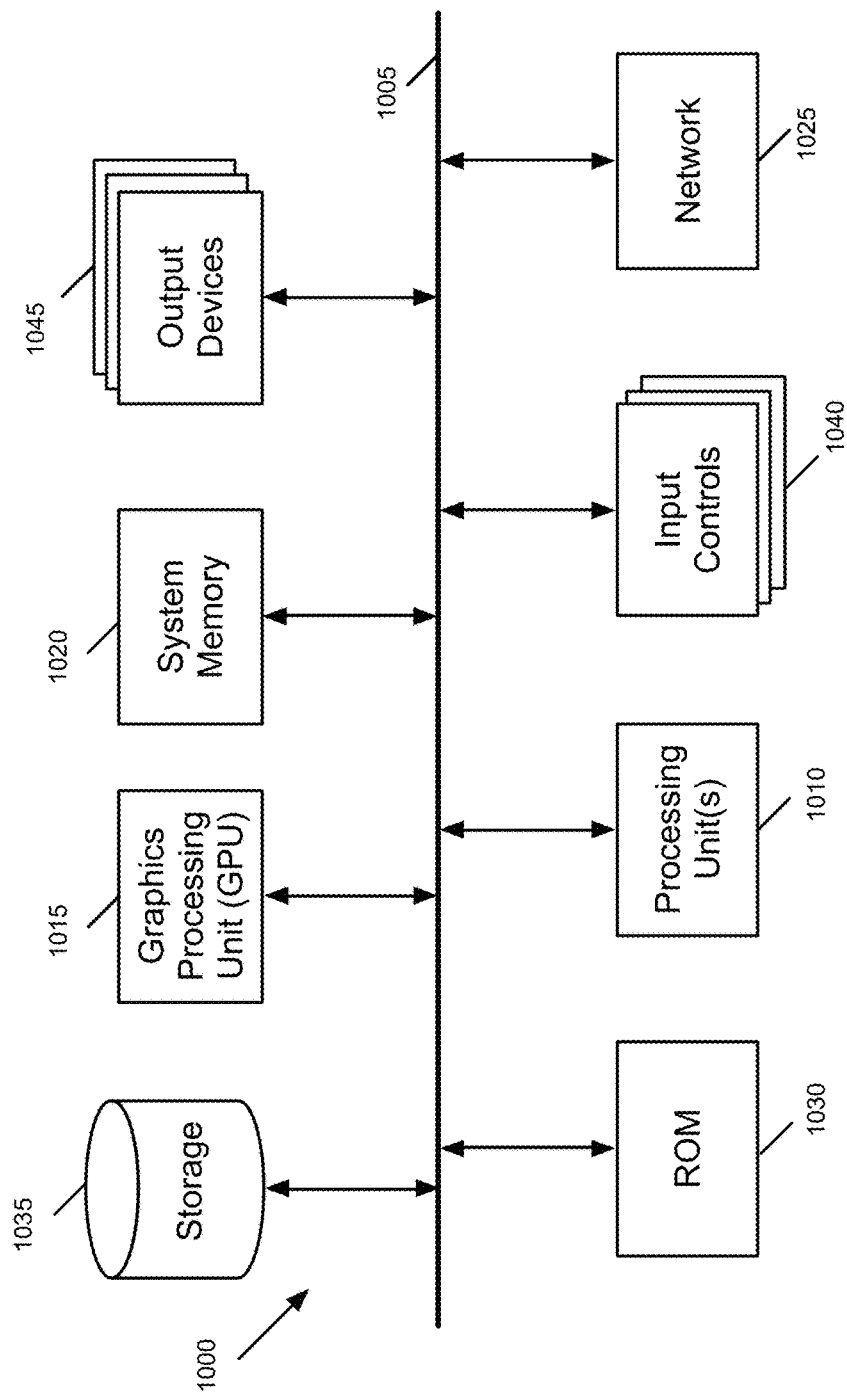
FIG. 10 illustrates an example of an electronic system with which some embodiments of the invention are implemented.

FIG. 10 conceptually illustrates another example of an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010. In some embodiments, such functionality can be provided using CoreImage's kernel shading language.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive, integrated flash memory) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet), or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 11:
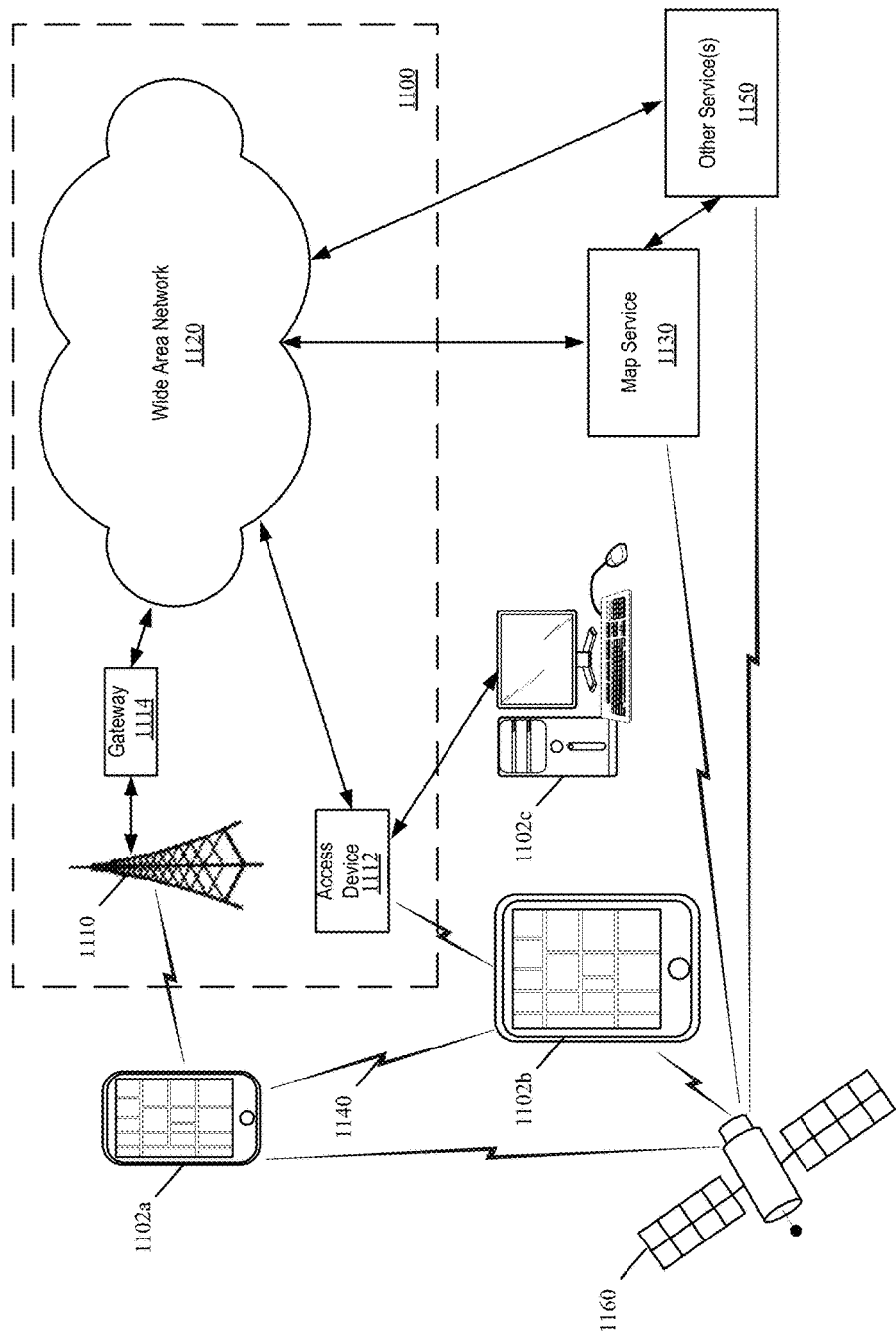
FIG. 11 illustrates a map service operating environment, according to some embodiments.

Various embodiments may operate within a map service operating environment. FIG. 11 illustrates one possible embodiment of an operating environment 1100 for a map service (also referred to as a mapping service) 1130 and client devices 1102a-1102c. In some embodiments, devices 1102a, 1102b, and 1102c communicate over one or more wired or wireless networks 1110. For example, wireless network 1110, such as a cellular network, can communicate with a wide area network (WAN) 1120, such as the Internet, by use of gateway 1114. A gateway 1114 in some embodiments provides a packet oriented mobile data service, such as General Packet Radio Service (GPRS), or other mobile data service allowing wireless networks to transmit data to other networks, such as wide area network 1120. Likewise, access device 1112 (e.g., IEEE 802.11g wireless access device) provides communication access to WAN 1120.

The client devices 1102a and 1102b can be any portable electronic or computing device capable of communicating with a map service (e.g., smart phone, tablet, laptop computer, etc.). Device 1102c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1102a-1102c are not shown as each accessing the map service 1130 via either the wireless network 1110 and gateway 1114 or the access device 1112, one of ordinary skill in the art will recognize that the client devices of some embodiments may access the map service via multiple different wired and/or wireless protocols.

Devices 1102a-1102c can also establish communications by other means. For example, these devices may communicate with other wireless devices (e.g., other devices 1102b, cell phones, etc.) over the wireless network 1110 or through access device 1112. Likewise the devices 1102a-1102c can establish peer-to-peer communications 1140 (e.g., a personal area network) by use of one or more communication subsystems, such as Bluetooth® communication or similar peer-to-peer protocols.

Devices 1102a-1102c may also receive Global Positioning Satellite (GPS) signals from GPS satellites 1160. In addition, in some embodiments the map service 1130 and other services 1150 may also receive GPS signals from GPS satellites 1160.

A map service 1130 may provide map services for one or more client devices 1102a-1102c in communication with the map service 1130 through various communication methods and protocols. A map service 1130 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1102a-1102c may utilize these map services to obtain the various map service data, then implement various techniques to process the data and provide the processed data to various entities (e.g., internal software or hardware modules, display screens of the client devices, external display screens, or other external systems or devices.

The map service 1130 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1102a-1102c, the map service 1130 of some embodiments, performs various optimization techniques to analyze a map tile before encoding the tile.

In some embodiments, the map tiles are generated by the map service 1130 for different possible display resolutions at the client devices 1102a-1102c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1130 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1130 responds to requests from the client devices 1102a-1102c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1102a-1102c that obtain map service data from the map service 1130 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1102a-1102c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1130. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1102a-1102c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1130 and/or other service(s) 1150 are configured to process search requests from any of the client devices. Search requests may include but are not limited to queries for businesses, addresses, residential locations, points of interest, or some combination thereof. Map service 1130 and/or other service(s) 1150 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1130 and/or other service(s) 1150 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1130 and/or other service(s) 1150, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1130 and/or other service(s) 1150 provide one or more feedback mechanisms to receive feedback from client devices 1102a-1102c. For instance, client devices may provide feedback on search results to map service 1130 and/or other service(s) 1150 (e.g., feedback specifying ratings, reviews, temporary or permanent business closures, errors etc.); this feedback may be used to update information about points of interest in order to provide more accurate or more up-to-date search results in the future. In some embodiments, map service 1130 and/or other service(s) 1150 may provide testing information to the client device (e.g., an A/B test) to determine which search results are best. For instance, at random intervals, the client device may receive and present two search results to a user and allow the user to indicate the best result. The client device may report the test results to map service 1130 and/or other service(s) 1150 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, several of the above-described embodiments provide a notification regarding a feature once the feature becomes available for an application in a particular locality. Other embodiments provide advance notification of a feature becoming available in a locality before the feature becomes available (e.g., provide a notification a duration of time (e.g., a day, a week, etc.) before the feature becomes available in a locality).

Many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A method comprising:
   for a first region, identifying availability of a feature of a multi-feature application that executes on devices in a plurality of regions;
   based on a determination that a first plurality of the devices are located in the first region, providing a notification to the first plurality of devices regarding the availability of the feature; and
   based on a determination that a second plurality of the devices are associated with the first region but are located in a second region that is different than the first region, providing the notification regarding the availability of the feature to the second plurality of devices, while not providing the notification to any other device in the second region that is not associated with the first region,
   wherein a particular device of the second plurality of the devices is associated with the first region because the particular device is registered in the first region.

2. The method of claim 1 further comprising providing the notification to a third plurality of devices that is within a threshold distance of the first region.

3. The method of claim 1 further comprising providing the notification to a third plurality of devices that is located in a third region associated with the first region, wherein the notification is provided because (1) the device is within the third region and (2) the third region is associated with the first region.

4. The method of claim 1, wherein
   a device is associated with a particular region when the device often travels to the particular region.

5. The method of claim 1, wherein the notification is a first notification, and the feature is a first feature, wherein the method further comprises:
   determining that, for the second region, a second feature has become available for the multi-feature application; and providing a second notification on a third plurality of devices located in the second region regarding the availability of the second feature in the second region.

6. The method of claim 1, wherein for a duration of time before the identifying of the availability of the feature, the feature was not available for the multi-feature application in the first region, but was available in another region.

7. The method of claim 1, wherein identifying the availability of the feature in the first region comprises examining a data structure that lists a set of features of the multi-feature application that have recently become available in a set of regions to determine that the feature has become available in the first region, the data structure stored in a non-transitory machine readable medium.

8. The method of claim 1, wherein the application is an operating system.

9. The method of claim 1, wherein the application executes on top of an operating system.

10. The method of claim 1, wherein identifying the availability of the feature comprises determining that, for the first region, the feature will become available within a threshold amount of time.

11. A non-transitory machine readable medium storing a program that when executed by at least one processor provides location based feature notifications to different devices, the program comprising sets of instructions for:
  identifying availability of a feature in a first region, wherein the feature is for a multi-feature application that executes on devices in a plurality of regions;
  based on a determination that a first plurality of the devices are located in the first region, providing a notification regarding the availability of the feature to the first plurality of devices; and
  based on a determination that a second plurality of the devices are associated with the first region but are located in a second region that is different than the first region, providing the notification regarding the availability of the feature to the second plurality of devices, while not providing the notification to any other device in the second region that is not associated with the first region,
  wherein a particular device of the second plurality of the devices is associated with the first region because the particular device is registered in the first region.

12. The non-transitory machine readable medium of claim 11, wherein the program further comprises a set of instructions for receiving requests for new notification data from the devices, wherein operations for providing the notification are performed in response to the requests.

13. The non-transitory machine readable medium of claim 12, wherein the requests for new notification data are received periodically.

14. The non-transitory machine readable medium of claim 11, wherein the program further comprises a set of instructions for periodically identifying the availability of features for the multi-feature application.

15. The non-transitory machine readable medium of claim 12, wherein the program further comprises sets of instructions for:
  detecting availability of the new notification data; and
  performing said identifying and providing operations in response to the detected availability of new notification data.

16. An apparatus comprising:
  a sensor for detecting a location of the apparatus;
  a set of processing units; and
  a non-transitory machine readable medium storing a multi-feature application that executes on top of an operating system of the apparatus, said multi-feature application and said operating system for execution by at least one processing unit of the set of processing units, the application comprising sets of instructions for:
    determining that a feature of the multi-feature application is recently available for a particular region by analyzing a notification data file received from a set of servers, wherein the notification data file comprises feature notification data for a plurality of regions that includes the particular region;
    using the sensor to determine that the apparatus is in the particular region; and
    based on the determination that the apparatus is in the particular region, providing the notification at the apparatus of the availability of the feature, the notification based on the received notification data.

17. The apparatus of claim 16, wherein the set of instructions for determining that the feature of the multi-feature application is available comprises a set of instructions for requesting the notification data file from the set of servers.

18. The apparatus of claim 16, wherein the application further comprises a set of instructions for, based on a determination that the apparatus is registered in the particular region, providing the notification at the apparatus of the availability of the feature.

19. The apparatus of claim 16, wherein the notification data is received with a first frequency and the set of instructions for determining that the feature of the multi-feature application is recently available further comprises a set of instructions for analyzing the received notification data file with a second frequency that is greater than the first frequency.

20. The apparatus of claim 16, wherein the feature is a first feature and the particular region is a first region, the set of instructions further comprising sets of instruction for:
  determining that the feature of the multi-feature application is recently available for a second region by analyzing the received notification data file;
  using the sensor to determine that the apparatus is in the second region; and
  based on the determination that the apparatus is in the second region, providing the notification at the apparatus of the availability of the second feature, the notification based on the received notification data.

21. An apparatus comprising:
  a sensor for detecting a location of the apparatus;
  a set of processing units; and
  a non-transitory machine readable medium storing a multi-feature application that executes on top of an operating system of the apparatus, said multi-feature application and said operating system for execution by at least one processing unit of the set of processing units, the application comprising sets of instructions for:
    determining that a feature of the multi-feature application is recently available for a particular region by analyzing a notification data file received from a set of servers, wherein the notification data comprises feature notification data for a plurality of applications that includes the multi-feature application;
    using the sensor to determine that the apparatus is in the particular region; and
    based on the determination that the apparatus is in the particular region, providing the notification at the apparatus of the availability of the feature, the notification based on the received notification data.

22. The apparatus of claim 21, wherein the application further comprises a set of instructions for, based on a determination that the apparatus often travels to the particular region, providing the notification at the apparatus of the availability of the feature.

* * * * *